（12）United States Patent
Skoog et al.

(10) Patent No.: US 7,588,797 B2
(45) Date of Patent: Sep. 15, 2009

(54) FIELD REPAIRABLE HIGH TEMPERATURE SMOOTH WEAR COATING

(75) Inventors: Andrew Jay Skoog, West Chester, OH (US); Jane Ann Murphy, Franklin, OH (US); William Randolph Stowell, Rising Sun, IN (US); David E. Caldwell, West Chester, OH (US)

(73) Assignee: General Electric Company, Schenectady, NY (US)

( * ) Notice: Subject to any disclaimer, the term of this patent is extended or adjusted under 35 U.S.C. 154(b) by 946 days.

(21) Appl. No.: 10/819,856

(22) Filed: Apr. 7, 2004

(65) Prior Publication Data

US 2005/0228098 A1   Oct. 13, 2005

(51) Int. Cl.
B05D 1/26 (2006.01)
B05D 1/40 (2006.01)
B05D 1/42 (2006.01)
B05D 7/14 (2006.01)

(52) U.S. Cl. .......... 427/142; 427/140; 427/226; 427/230; 427/299; 427/327; 427/355; 427/356; 427/372.2; 427/397.7; 427/402; 427/403; 427/419.1; 427/419.2

(58) Field of Classification Search .............. 427/142, 427/140, 201, 226, 446, 453
See application file for complete search history.

(56) References Cited

U.S. PATENT DOCUMENTS

| 4,018,944 A | 4/1977 | Hallstrom et al. |
| 5,431,961 A | 7/1995 | Kirkwood et al. |
| 5,626,923 A | 5/1997 | Fitzgibbons et al. |
| 5,723,078 A | 3/1998 | Nagaraj et al. |

(Continued)

FOREIGN PATENT DOCUMENTS

EP   1 197 585 A2   4/2002

(Continued)

OTHER PUBLICATIONS

Muh, E. et al., "Organic-Inorganic Hybrid Nanocomposites Prepared by Means of Sol-Gel Condensation of Bismethacrylatesilanes in Reactive Diluents," Adv. Funct. Mater. 2001, 11, No. 6, pp. 425-429, Dec. (2001).*

Primary Examiner—Michael Kornakov
Assistant Examiner—Alexander Weddle
(74) Attorney, Agent, or Firm—McNees Wallace & Nurick, LLC

(57) ABSTRACT

A chemical composition and method for repairing a thermal barrier coating on a component designed for use in a hostile thermal environment, such as turbine, combustor and augmentor components of a gas turbine engine. The method repairs a thermal barrier coating on a component that has suffered localized damage to the thermal barrier coating. After cleaning the surface area of the component exposed by the localized spallation, a paste-like mixture of a ceramic composition comprising ceramic powders and nano-sized ceramic materials in a binder is applied to the surface area of the component, and is optionally smoothed using mechanical means. The composition is then allowed to dry and cure to form a dried coating having polymeric characteristics. Upon subsequent heating, the dried coating reacts to produce a glassy ceramic repair coating. Due to the thixotropic properties of the coating composition upon application to a component, the repair method can be performed in-situ while the component remains installed in its operating environment.

16 Claims, 1 Drawing Sheet

U.S. PATENT DOCUMENTS

| | | | |
|---|---|---|---|
| 5,849,110 A | 12/1998 | Blohowiak et al. | |
| 5,969,078 A * | 10/1999 | Freeman | 528/87 |
| 5,985,368 A | 11/1999 | Sangeeta et al. | |
| 6,010,746 A | 1/2000 | Descoteaux et al. | |
| 6,065,643 A * | 5/2000 | Harvey et al. | 222/94 |
| 6,123,997 A | 9/2000 | Schaeffer et al. | |
| 6,235,352 B1 | 5/2001 | Leverant et al. | |
| 6,413,578 B1 * | 7/2002 | Stowell et al. | 427/142 |
| 6,827,969 B1 * | 12/2004 | Skoog et al. | 427/142 |
| 2001/0053410 A1 | 12/2001 | Fernihough et al. | |
| 2003/0008764 A1 | 1/2003 | Wang et al. | |
| 2004/0050913 A1 | 3/2004 | Philip | |

FOREIGN PATENT DOCUMENTS

| | | |
|---|---|---|
| EP | 1 251 191 A1 | 10/2002 |
| EP | 1 471 043 A2 | 10/2004 |
| WO | WO 97/11040 | 3/1997 |

\* cited by examiner

FIELD REPAIRABLE HIGH TEMPERATURE SMOOTH WEAR COATING

FIELD OF THE INVENTION

This invention relates to thermal barrier coatings for components exposed to high temperatures, such as the hostile thermal environment of a gas turbine engine. More particularly, this invention is directed to a composition and method for repairing a thermal barrier coating that has suffered localized spallation due to thermal fatigue and stress, poor coating processes, coating defects, localized damage, impact damage and other mechanical damage, or defective coating areas on new or used parts.

BACKGROUND OF THE INVENTION

Higher operating temperatures for gas turbine engines are continuously sought in order to increase their efficiency. However, as operating temperatures increase, the high temperature durability of the components of the engine must correspondingly increase. Significant advances in high temperature capabilities have been achieved through the formulation of nickel and cobalt-base superalloys. Nonetheless, when used to form components of the turbine, combustor and augmentor sections of a gas turbine engine, such alloys alone are often susceptible to damage by oxidation and hot corrosion attack and may not retain adequate mechanical properties. For this reason, these components are often protected by an environmental and/or thermal-insulating coating, the latter of which is termed a thermal barrier coating (TBC) system. Ceramic materials, and particularly yttria-stabilized zirconia (YSZ), are widely used as a thermal barrier coating (TBC), or topcoat, of TBC systems used on gas turbine engine components. These particular materials are widely employed because they can be readily deposited by plasma spray, flame spray and vapor deposition techniques. A commonly used type of TBC is a coating based on zirconia stabilized with yttria, for example about 93 wt. % zirconia stabilized with about 7 wt. % yttria. This general type of TBC has been reported in such United States patents as U.S. Pat. Nos. 4,055,705, 4,328,285, and 5,236,745, which are incorporated herein by reference. Such TBC coatings have a relatively rough surface and do not provide adequate heat energy reflection for certain applications. In addition, application of certain TBC coatings requires use of apparatus having a controlled atmosphere or vacuum. Accordingly, such coatings and methods cannot be effectively utilized in field repairs.

To be effective, TBC systems must have low thermal conductivity, strongly adhere to the component, and remain adherent throughout many heating and cooling cycles. The latter requirement is particularly demanding due to the different coefficients of thermal expansion between ceramic topcoat materials and the superalloy substrates they protect. To promote adhesion and extend the service life of a TBC system, a bond coat is often employed. Bond coats are typically in the form of overlay coatings such as MCrAlX (where M is iron, cobalt and/or nickel, and X is yttrium or another rare earth element), or diffusion aluminide coatings. During the deposition of the ceramic TBC and subsequent exposures to high temperatures, such as during engine operation, these bond coats form a tightly adherent alumina ($Al_2O_3$) layer or oxide scale that adheres the TBC to the bond coat.

The service life of a TBC system is typically limited by a spallation event brought on by thermal fatigue and stress, coating defects, mechanical damage, wear, and the like. Accordingly, a significant challenge of TBC systems has been to obtain a more adherent ceramic layer that is less susceptible to spalling when subjected to thermal cycling. Though significant advances have been made, there is the inevitable requirement to repair components whose thermal barrier coatings have spalled. Though spallation typically occurs in localized regions or patches, the conventional repair method has been to completely remove the thermal barrier coating, restore or repair the bond layer surface as necessary, and then recoat the entire component. Prior art techniques for removing TBC's include grit blasting or chemically stripping with an alkaline solution at high temperatures and pressures. However, grit blasting is a slow, labor-intensive process and erodes the surface beneath the coating. With repetitive use, the grit blasting process eventually destroys the component. The use of an alkaline solution to remove a thermal barrier coating is also less than ideal, since the process requires the use of an autoclave operating at high temperatures and pressures. Consequently, conventional repair methods are labor-intensive and expensive, and can be difficult to perform on components with complex geometries, such as airfoils and shrouds. As an alternative, U.S. Pat. No. 5,723,078 to Nagaraj et al. teaches selectively repairing a spalled region of a TBC by texturing the exposed surface of the bond coat, and then depositing a ceramic material on the textured surface by plasma spraying. While avoiding the necessity to strip the entire TBC from a component, the repair method taught by Nagaraj et al. still requires removal of the component from the engine assembly in order to deposit the ceramic material, and further requires the use of plasma spraying apparatus to effect the repair.

Moreover, existing sprayable TBC materials require some type of post drying or firing in order to be stabilized prior to high temperature use, and therefore are ineffective for in-situ field repairs. Tape materials require an autoclave to apply, and are thus not feasible for in-situ repairs. While plasma sprayed materials do not all require post-deposition heating, such materials have much rougher finishes, and cannot be applied in the field for in-situ repairs without spraying powder throughout the rest of the engine (which requires a major cleaning step prior to subsequent engine operation).

In the case of aircraft turbine engines and large power generation turbines, removing the turbine from service for repairs results in significant costs in terms of labor and downtime. For these reasons, removing components having TBCs that have suffered only localized spallation is not economically desirable. As a result, components identified as having spalled TBC are often analyzed to determine whether the spallation has occurred in a high stress area, and a judgment is then made as to the risk of damage to the turbine due to the reduced thermal protection of the component that could lead to catastrophic failure of the component. If the decision is to continue operation, the spalled component must typically be scrapped at the end of operation because of the thermal damage inflicted while operating the component without complete TBC coverage. Additionally, some newer TBCs utilize a smoothing layer over the TBC for better heat rejection and air flow. Currently, there is no known way at present to replace this smoothing layer having a very smooth finish on damaged TBC.

Accordingly, it would be desirable if a repair method were available that could be performed on localized spalled areas of TBC on turbine hardware in field and in situ, without necessitating that the component be removed from the turbine, so that downtime and scrappage are minimized.

It would also be desirable to repair a smoothing layer on a damaged TBC in a manner that restores the very smooth finish of the smoothing layer, as well as restoring the heat rejection and airflow properties of the smoothing layer.

It would further be desirable to provide an improved smoothing coating for repair of damaged TBC that is easy to apply by caulking, spackling or brushing in-situ.

SUMMARY OF THE INVENTION

The present invention provides a chemical composition and method for repairing a thermal barrier coating on a component that has suffered due to spallation, fatigue, stress damage, poor coating processes, mechanical damage, or wear of the thermal barrier coating. The use of the methods and compositions of the present invention is particularly applicable for in-field repair of TBC coatings having spallation damage with a spall damage depth of between about 1 to about 50 mils (0.001 inch to 0.050 inch). For spalls having a depth of over 20 mils and approaching 50 mils, the composition of the present invention can be provided using a lower weight percentage of solvent, yielding putty-like properties to allow application of the composition using a blade or putty knife and to permit working and smoothing before drying.

The composition demonstrates thixotropic properties as a result of its selected components, and particularly the inclusion of at least one nano-sized ceramic material, such as fine or fumed ceramic material. The amount of nano-sized ceramic material such as alumina ($Al_2O_3$), titanium dioxide ($TiO_2$), calcium oxide (CaO), magnesium oxide (MgO), or silicone dioxide ($SiO_2$) is provided so as to impart thixotropic properties to the coating composition. The thixotropic properties are very important in allowing the coating to be applied in a non-controlled environment such as an on-wing turbine engine assembly. Even though the coating dries relatively quickly depending upon solvent selection and solvent content, time for polymerization and other stabilizing chemical and physical interactions can be 8 hours or longer. The thixotropic nature of the coating composition allows it to be applied to a surface, regardless of surface orientation, by a variety of processes without running, slumping, or sagging while it dries, and further allows the coating to be worked as necessary. As used herein, the term thixotropic refers to a property of a material composition that enables it to flow when subjected to a mechanical force such as a shear stress or when agitated and return to a gel-like form when the mechanical force is removed. This definition is consistent with the definition of thixotropy as set forth in Hawley's Condensed Chemical Dictionary (Thirteenth Edition) and the Encyclopedia Britannica. This property allows the coating to be applied in a production or field repair environment to damaged surfaces having complex geometries, including but not limited to spalled areas of TBC coated components such as turbine blades and shrouds, without exposing the undamaged component surfaces underlying or adjacent to the damaged surfaces to slumping, running or dripping of the coating. These important thixotropic properties allow the coating to be applied to a surface by any one of a number of processes such as spraying, dipping, brushing etc. The applied coating will not flow due to the effects of gravity such as by slumping, running, or dripping after application. However, the coating will flow if it is subjected to a mechanical shear stress, allowing it to be worked, if so desired. Thus, during the early stages of the drying period the coating can be worked if necessary. Of course, the ability to work the coating will be gradually diminished during the drying period, wherein the solvent evaporates to form a coating including binder particles having polymeric bonds therebetween. The drying period is dependent on the evaporation of solvent and drying and the resulting formation of polymeric bonds or "curing" of the binder, up until drying is complete. These properties allow the coating to overcome problems of dripping and running experienced with other coatings, which problems can leave portions of the substrate uncoated.

Once applied and permitted to dry for about 8 hours at room temperature, the composition is stable and the resulting dry and partially cured coating is ready for high temperature use. Thermal shock data on as-dried material was capable of withstanding temperatures of about 2000° F., and IR reflection improvements were noted. Additionally, upon heat treatment, such as firing by engine operation, the coating becomes fully cured, and is at least partially converted to a ceramic matrix that includes ceramic materials. The matrix coating exhibits lower roughness or Ra values than TBCs applied by other methods. In any event, the coating formed by curing and firing the applied composition can be smoothed, such as by sanding with a diamond pad, to achieve a desired smoothness. Such post-application smoothing is particularly appropriate for repair of deeper (approaching 50 mils) spalled areas.

As a result of the foregoing properties, the coating composition demonstrates adhesion to a wide variety of substrates, including but not limited to bare metal, grit blasted metal, coated metals and coated ceramics of all types, TBCs, and many high temperature composites. The composition and method of the present invention allow on-wing, in-field, in-situ repair of TBC defects in smooth coat finish, and requires no post treatment heating or firing to stabilize the dried coating before high temperature use.

The present invention provides for in-situ repair of a TBC coating without the need for post-coating heat treatment commonly required among known TBC repair methods. Indeed, the composition allows for use of room temperature or "cold" application methods to effect a repair of the TBC coating. Alternatively, elevated temperatures can be utilized, such as heat lamp, heat blanket treatment, or heat gun treatment to accelerate drying and curing time, and optionally to at least partially convert the coating to a ceramic matrix, without adversely affecting the desirable properties of the repair coating.

The method of applying the chemical composition of the present invention preferably involves application or at room temperature, without the need to apply heat to cure the composition to effect the repair. In one embodiment, after cleaning the surface area of the component exposed by the localized spallation, the chemical composition is applied as a caulk or paste. The caulk or paste can be stored in known packaging and distributing vessels, such as tubes and canisters having distributing nozzles, stems or the like. Depending upon the delivery system used, the dispensed product may require working, such as with a putty knife or blade or other known means for smoothing caulks, pastes, and chemical compositions of similar consistency. Alternatively, in a liquid mixture embodiment, the composition includes a higher percentage of solvent by weight, allowing distribution through known liquid spraying means.

After application, the chemical composition forms an even thin layer of ceramic and polymer composition over the over the bond coat or substrate exposed by the spall and the adjacent TBC coating. The solvent carrier then evaporates to leave a thin protective layer of binder and ceramic materials over the surface area of the component. The coating is permitted to dry at ambient temperature, preferably for at least about 8 hours. The dried coating composition has the attributes of a polymer by virtue of polymeric bonds formed within the binder. Drying and curing continues over time, and is further accelerated when the part is optionally exposed to a heat source. However, drying may be accomplished at room temperature.

Optionally, the coating is heat treated soon after coating deposition to accelerate the dry and curing time. In the subsequent engine operation, the dried coating is fired in-situ by engine heat which causes the binder to decompose or react to yield a ceramic-including repair coating that covers the surface area of the component, and that comprises the ceramic powder in a matrix of a material formed when the binder is reacted at high temperature for a sufficient period of time. The binder is preferably a ceramic precursor material that can be converted immediately to a glass or ceramic by heating, or allowed to thermally decompose over time to form a glassy ceramic repair coating. Although higher operating temperature causes more of the glass to convert to ceramic, the coating retains at least some glassy characteristics since engine operating temperatures are believed to be insufficient to form a pure ceramic.

According to the invention, each step of the repair method can be performed while the component remains installed at ambient temperature, e.g., in the flowpath assembly of an idle gas turbine engine. Within 8 hours after the step of applying the composition at ambient temperature, the turbine engine can resume operation at which time the heat generated by operation of the engine will fire the dried and partially cured coating to produce a glassy ceramic coating. However, the period for drying and curing can be optionally accelerated by application of heat treatment.

In view of the above, it can be appreciated that the invention overcomes several disadvantages of prior methods used to repair thermal barrier coatings. In particular, the method of this invention does not require the thermal barrier coating to be completely removed, nor does the invention require removal of the component in order to repair its thermal barrier coating. As a further advantage, the repair process does not require a high temperature application or subsequent high-temperature treatment, since the repair coating exhibits sufficient strength to withstand engine operation, and is cured or fired by engine operation to form a glassy ceramic coating system. Another advantage of the repair is that it requires no special application equipment, and can be done in ambient conditions, i.e. there is no requirement to maintain a controlled atmosphere (such as by establishing an inert gas or vacuum environment) during repair.

Additionally, this coating provides a lower roughness finish with improved heat rejection and also provides lower energy transmission. As a result, minimal downtime is necessary to complete the repair and resume operation of the turbine engine. The invention can be used in any gas turbine component having a TBC, such as aircraft engines and turbines for electrical power generation. In the case of power generation turbines, the cost of completely halting power generation for an extended period in order to remove, repair and then reinstall a component that has suffered only localized spallation is avoided. Also avoided is the need to decide whether or not to continue operation of the turbine until the spalled component is no longer salvageable at the risk of damaging the component and the turbine.

Other objects and advantages of this invention will be better appreciated from the following detailed description. Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Whenever possible, the same reference numbers will be used throughout the drawings to refer to the same or like parts.

DETAILED DESCRIPTION OF THE INVENTION

The present invention is directed to components in the hot section of gas turbine engine assemblies that are protected by thermal barrier coatings for operation within environments characterized by relatively high temperatures, and therefore subjected to severe thermal stresses and thermal cycling. Notable examples of such components include the high and low pressure turbine nozzles and blades, shrouds, combustor liners and augmentor hardware of gas turbine engines for use in aircraft and industrial applications. While the advantages of this invention are particularly applicable to components of gas turbine engines, the invention is generally applicable to any component in which a thermal barrier coating is used to thermally insulate a component from its environment. By way of reference, Applicant hereby incorporates commonly-owned U.S. patent application Ser. No. 10/735,359 as if fully set forth herein.

Figure 1:
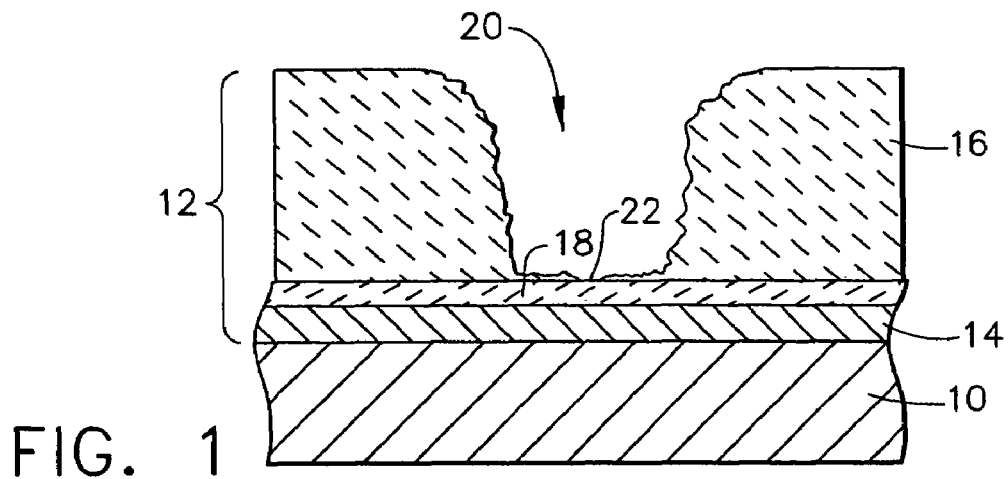
FIG. 1 is a cross-sectional representation of a component surface protected by a thermal barrier coating that has suffered localized spallation.

Represented in FIG. 1 is a surface region of a component 10 protected by a thermal barrier coating (TBC) system 12. The TBC system 12 is shown as being comprised of a bond coat 14 formed on the substrate surface of the component 10, and a ceramic layer 16 deposited on the bond coat 14 as the thermal barrier coating. As is the situation with high temperature components of gas turbine engines, the component 10 may be formed of a nickel, cobalt or iron-base superalloy. The bond coat 14 is preferably formed of a metallic oxidation-resistant material, so as to protect the underlying component 10 from oxidation and enable the ceramic layer 16 to more tenaciously adhere to the component 10. Suitable materials for the bond coat 14 include MCrAlX overlay coatings and diffusion aluminide coatings. Also shown is a then tightly adherent oxide scale, typically $Al_2O_3$, formed by exposing the bond coat to an elevated temperature.

Typically, the TBC ceramic layer 16 is deposited by plasma spraying, such as air plasma spraying (APS), although other deposition methods may be used such as EB deposition, PVD or CVD processes. A preferred material for the ceramic layer 16 is an yttria-stabilized zirconia (YSZ), a preferred composition being about 4 to about 8 weight percent yttria, though other ceramic materials could be used, such as yttria, nonstabilized zirconia, or zirconia stabilized by magnesia (MgO), ceria ($CeO_2$), scandia ($Sc_2O_3$) and/or other oxides. The ceramic layer 16 is deposited to a thickness that is sufficient to provide the required thermal protection for the component 10, typically on the order of about 50 to about 300 micrometers (about 0.002 to about 0.012 inches) for most gas turbine engine components. However, thicker (up to about 0.0040 inches) TBC applications are possible.

As a gas turbine engine component, surfaces of the component 10 are subjected to hot combustion gases during operation of the engine, and are therefore subjected to severe attack by oxidation, corrosion and erosion. Accordingly, the component 10 must remain protected from its hostile operating environment by the TBC system 12. Loss of the ceramic layer 16 due to spallation leads to premature and often rapid deterioration of the component substrate 10. A localized spalled or mechanically damaged region 20 of the ceramic layer 16 is represented in FIG. 1, with the TBC repair process of this invention being represented in FIGS. 2 and 3. According to the invention, each of the following steps performed in the repair of the component 10 is performed while the component 10 remains installed in the turbine engine, thereby completely avoiding the prior requirement to remove and later reinstall the component.

The repair process preferably begins with cleaning the surface 22 exposed by the localized spalled region 20 so as to remove loose oxides and contaminants such as grease, oils and soot, though preferably without damaging the bond coat 14 or removing any residual fragments of the ceramic layer 16 that adhere to the bond coat 14. While various techniques can be used, a preferred method is to remove loose materials and contaminants in and around the spalled or mechanically damaged region 20, and optionally dressing the spalled area by removing a predetermined amount of undamaged TBC, preferably down to the bond coat 14 without damaging the bond coat 14. Additionally, where the bond coat 14 is damaged, the method allows for application of a bond coat 14 over the damaged region prior to applying the coating composition. Prior to application of any bond coat 14 or coating composition, the exposed surface 22 of the damaged region must be cleaned with an evaporable cleaner such as alcohol and/or acetone. This step can be selectively performed to ensure that the surrounding undamaged ceramic layer 16 is not subjected to the procedure.

Figure 2:
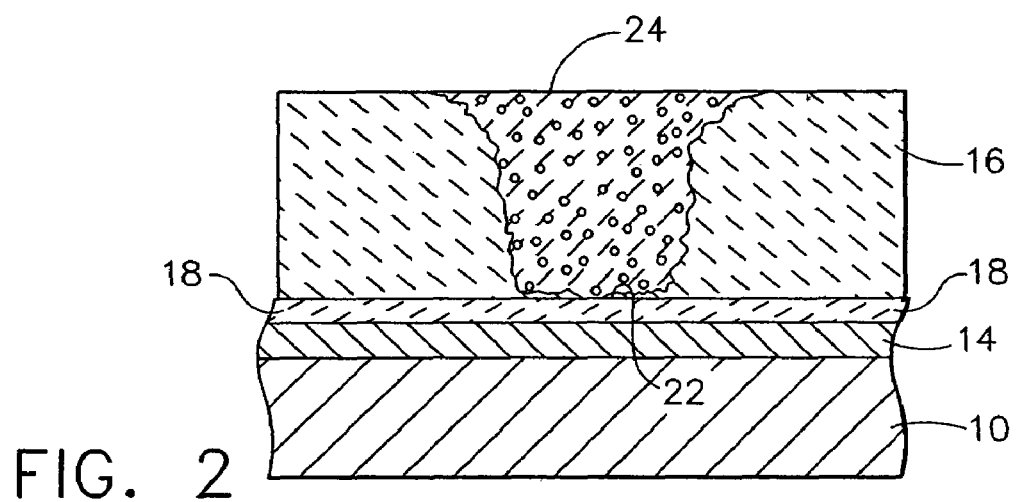
FIGS. 2 and 3 are cross-sectional representations of the component surface of FIG. 1 during the repair of the thermal barrier coating in accordance with the present invention.
Figure 3:
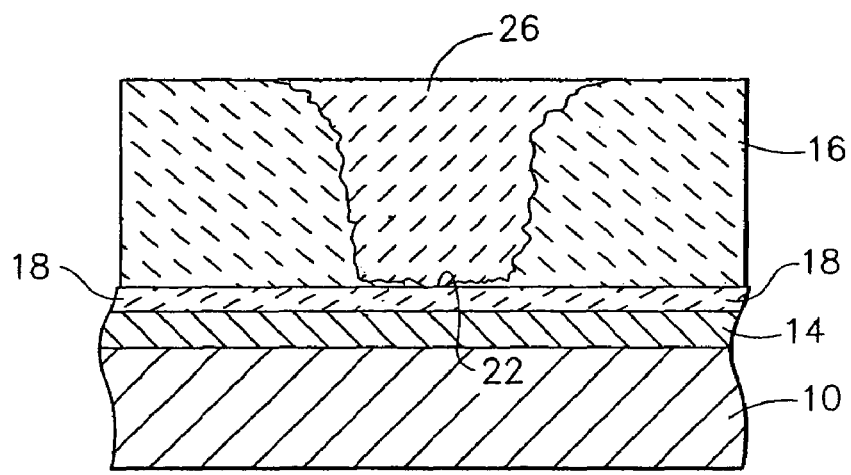

Once cleaned, and optionally dressed and/or re-coated with a bond coat, the spalled region 20 is covered with a ceramic chemical composition 24, as represented by FIG. 2. According to the invention, the ceramic chemical composition 24 is a paste-like mixture of ceramic powders and a binder that cure to form a ceramic repair coating 26 shown in FIG. 3 as adhering to the surface exposed 22, which may be defined by portions of the bond coat 14, oxide scale 18 and/or remnants of the ceramic layer 16.

The chemical composition 24 is preferably is a paste-like mixture comprising one or more refractory materials such as ceramic or glass, the refractory material provided in powdered form and provided in at least two predetermined particle size ranges, a binder, one or more nano-sized ceramic materials, and a solvent. Suitable refractory materials include, but are not limited to alumina, zirconia, hafnia, magnesia, titania, calcia, silica, yttria, other refractory ceramic materials, and combinations thereof. Preferably, the refractory material is provided in two particle size ranges; the first range being less than about 1 micron but greater than about 30 nanometers; the second particle size range being between about 45 microns to about 75 microns. The binder is a ceramic precursor material, preferably a silicone or a phosphate-based composition, though it is foreseeable that other ceramic precursor binders could be used, including colloidal or sol gel chemistries that thermally decompose to form refractory oxides, and possibly calcium aluminate cements.

The term "nano-sized ceramic material", as used herein, is defined as a sub-30 nanometer-sized material having ceramic characteristics, such as alumina ($Al_2O_3$), titania ($TiO_2$) and silica ($SiO_2$). The nano-sized ceramic material is preferably provided in a particle size of between about 5 to about 30 nanometers, and more preferably between about 10 and about 25 nanometers. The addition of this nano-sized ceramic material represents a significant performance improvement in terms of applying the coating composition, and in resulting coating smoothness and density. It is believed that the nano-sized particles of the ceramic material fills interstices or voids between the refractory materials in the matrix formed by the applied coating to impart thixotropic properties to the coating so that an extremely smooth and wear-resistant finish can be obtained. While any nano-sized version of the above materials will suffice, a particularly suitable material is AEROXIDE® Alu C by Aerosil, a business line of DeGussa AG, Weissfrauenstrasse 9, D-60287 Frankfurt am Main, Germany. AEROXIDE® Alu C is a very fine pyrogenic metal oxide having a high specific surface area, and having a content of $Al_2O_3$ of greater than or equal to 99.6 percent based upon ignited material, with an average particle size of 13 nanometers. DeGussa also makes fumed $SiO_2$ and fumed $TiO_2$ in nano-sized particle ranges that can be used as the nano-sized ceramic material in the present invention. Additionally, T-64 (100) alumina, which is a ground alumina product, can be added as an aggregate filler material where the repair area is thicker (such as greater than about 0.0020 inches) and/or where the location and type of repair area make application with a putty knife or blade appropriate.

The evaporable solvent of the composition 24 will depend on the particular binder and ceramic ingredients used and the method of application, with the amount being sufficient to fully dissolve the binder. For example, a suitable solvent for the silicone or phosphate-based binder is an alcohol such as denatured alcohol (e.g., ethyl alcohol combined with 5% isopropyl alcohol) and other alcohols, or acetone, methyl ethyl ketone, zylene, and new lower VOC solvents, which may comprise a mixture of organic solvents. If the composition is to e sprayed, the binder and ceramic refractory components are mixed with sufficient solvent to uniformly distribute the components to form a sprayable liquid mixture. If the composition is to be applied as a paste, less solvent is mixed with the binder and ceramic refractory components.

According to one preferred embodiment of the invention, the chemical composition includes a mixture of: about 5 to about 65 weight percent alpha alumina powder made of ultra-pure alumina having a purity of about 99.99% and a particle size of less than 1 micron but greater than 30 nanometers, such as SM8 marketed by Baikowski International Corporation; about 5 to about 75 weight percent of a calcined alumina, preferably having a purity of about and 99.8%, and having a particle size predominantly in the range of greater than 45 to less than about 75 microns; such as that marketed by Alcoa Chemical Division as A-14 (325) material; about 4 to about 45 weight percent of a binder, such as a silicone or phosphate binder; about 5 to about 70 weight percent of a nano-sized ceramic material selected from the group consisting of alumina, titanium, dioxide, and silicone dioxide; and about 2 to about 35 weight percent of solvent, such as denatured alcohol or acetone.

In another embodiment, a composition that has been found particularly suitable includes about 8 to about 15 weight percent SM8 alumina, about 20 to about 40 weight percent A14 (325) alumina, about 5 to about 20 weight percent silicone, about 30 to about 60 percent nano-sized alumina, and about 2 to about 20 weight percent solvent such as denatured alcohol (e.g. ethyl alcohol combined with 5% isopropyl alcohol), acetone, or denatured alcohol with ethyl acetate and isobutyl ketone added. Examples of other preferred chemical compositions appear in the tables below:

| Material Based on Weight Percentage | Weight % |
|---|---|
| Denatured Alcohol or Acetone | 5.4 |
| SM8 alumina | 11.3 |
| A14 (−325 mesh) alumina | 30.6 |
| Silicone binder | 9.5 |
| T-64 (−100 mesh) alumina | 43.2 |

| Material Based on Weight Percentage | Weight % Ranges |
|---|---|
| Denatured Alcohol or Acetone | 2-20 |
| SM8 alumina | 8-15 |
| A14 (−325 mesh) alumina | 20-40 |
| Silicone binder | 5-20 |
| Nano-sized ceramic material | 30-60 |

The above are exemplary, and are not limiting. Other combinations and variations of ingredients and amounts are within the scope of the invention.

In order to prepare the chemical composition 24, the ceramic powder and nano-sized ceramic material(s) are combined with the binder and solvent in an amount sufficient to preferably form a paste-like mixture. A ceramic to binder ratio of about 8 to 1 is generally preferred, such as when using the above-noted combinations. Although a paste-like mixture is preferred, additional solvent can be provided to yield a more fluid mixture if spraying application methods are to be used.

Preferred binders include silicone resins manufactured by GE Silicones under the names SR350 and SR355, and classified as a methylsesquisiloxane mixture of the polysiloxane family in amounts of up to about 45% weight percent of the composition. Preferred phosphate-based binders include aluminum phosphate and complex phosphate materials that are commercially available from various sources such as Budenheim, Chemische Fabrik in amounts of up to about 45% weight percent of the composition. The chemical composition 24 may include additional additives, particularly one or more surfactants to achieve a suitably tacky consistency that enables the composition 24 to adhere to surface 22, which as noted above may be defined by portions of the metallic bond coat 14, the oxide scale 18 and/or remnants of the ceramic layer 16. For example, up to about 15% weight percent of a nonionic surfactant may be desirable. Examples of suitable surfactants/dispersants commercially available are PS21A and Merpol from Witco and Stephan, respectively. The composition may also include dispersants to uniformly distribute the ingredients within the composition.

In the preferred embodiment, the paste-like mixture of the chemical composition 24 can be applied in any suitable paste or caulk dispensing apparatus, and the dispensed composition can be smoothed using any known mechanical means such as putty blades and knives, brushes, sponges, and other known applicators. In the a preferred embodiment, the chemical composition is a pressure-dispensable composition contained in a portable, self-contained tube or canister having a dispensing nozzle or stem for evenly and controllably distributing the dispensed composition onto a surface such as an airfoil or other aircraft engine assembly component. No primer is necessary due to the adhesive and thixotropic properties of the composition. However, in some cases, improved adhesion can result by thinning the composition with solvent and brushing the resulting mixture into the repair area as a primer, and allowing the solvent to flash off prior to applying the unthinned coating composition to form a repair coating. Additionally, the composition may be applied in consecutive layers to completely fill the spalled or damage coating area If desired, each layer may be allowed to dry before application of a subsequent layer.

No post-deposition, pre-use, heat treatment is required to form the dry and cured coating, since upon evaporation of the solvent, the silicone acts as a binder that initially cures by polymerization to form a silicone-alumina matrix whose strength is sufficient for engine operation. Thus, depending on the composition 24 and desired results, the applied composition 24 may either be permitted to simply react at room temperature, or alternatively drying and curing can be accelerated by heating such as with a heat lamp, torch or other heat source. Suitable thermal treatments are about eight hours at room temperature, about 2 hours at about 150 degrees F., and about 30 minutes at about 250 degrees F.

After sufficient drying and curing, the composition 24 is essentially a cured polymeric composition. Testing of repair coatings 26 with silicone as the binder has shown that, the repair coatings 26 of this invention are characterized by enough residual strength to remain firmly adhered to the surface 22 within the spalled or mechanically damaged region 20 in the ceramic layer 16 until it is fired to form a ceramic. Phosphate binders are expected to yield similar results.

After application, drying, and curing, during initial operation of the turbine engine the coating is further cured and is at least partially converted to a glassy ceramic repair coating 26. In subsequent engine operations, the repair coating 26 continues to undergo drying, curing, and ceramic conversion reactions associated with an increase in the strength and other mechanical properties of the coating 26. It is believed that exposure to engine heat causes the nature of the bonds of the composition to change from essentially polymeric to glassy ceramic. The higher the temperature that the composition is exposed to, the more ceramic is formed. However, at the maximum temperatures created by engine operation, it is believed that the composition will retain some glassy ceramic characteristics, and will not be fully converted to a ceramic. For example, in the preferred embodiment of the composition that includes a silicone binder, during extended engine operation at high temperatures, the binder, such as silicone, thermally decomposes to silica, forming a silica matrix in which the at least three particle sizes of the refractory materials are dispersed.

While the invention has been described with reference to a preferred embodiment, it will be understood by those skilled in the art that various changes may be made and equivalents may be substituted for elements thereof, without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for locally repairing a damaged thermal barrier coating on a component surface, the method comprising the steps of:

providing a ceramic coating composition comprising ceramic powders provided in two predetermined particle size ranges of less than 1 micron but greater than 30 nanometers and between about 45 microns to about 75 microns, respectively, at least one nano-sized ceramic material having a particle size of no greater than 30 nanometers, and a binder, the binder being chosen from the group consisting of ceramic precursor binders that thermally decompose to form a refractory material, and a solvent, the composition mixed to uniformly distribute the ceramic powders, nano-sized ceramic material, the binder, and the solvent;

applying the ceramic coating composition on a surface area of the component exposed by the localized damage;

mechanically smoothing the composition to form an uncured coating, the uncured coating composition characterized by the ability to flow when subjected to a mechanical stress and to remain in place when the mechanical stress is removed; and evaporating the solvent and curing the coating composition for a period sufficient to yield a dried coating that covers the surface area of the component, the dried coating comprising the ceramic powders and nano-sized ceramic material in a polymeric matrix.

2. The method of claim 1, further including the steps of, prior to applying the ceramic coating composition, cleaning the damaged area of the coating.

3. The method according to claim 1, wherein the ceramic powders further comprise at least one ceramic material chosen from the group consisting of alumina, zirconia, hafnia, magnesia, titanium, calcium, and silica.

4. The method according to claim 1, wherein the at least one nano-sized ceramic material is selected from the group consisting of alumina, titania, and silica.

5. The method according to claim 1, wherein the binder is selected from the group consisting of silicone binders and phosphate binders.

6. The method according to claim 1, wherein the component is a component of a gas turbine engine assembly.

7. The method according to clam 1, wherein the step of applying is performed in a non-controlled atmosphere using paste delivery systems selected from the group consisting of tubes and containers having dispensing nozzles for dispensing and smoothly applying the composition to the surface of the component.

8. The method according to claim 1, wherein the step of mechanically smoothing the composition is accomplished using mechanical means selected from the group consisting of putty knives, putty blades, brushes, and sponges.

9. The method according to claim 1, further including the step of applying heat to the dried coating at a sufficiently high temperature to modify the binder to form a repair coating comprising the ceramic powders and nano-sized ceramic material in a glassy ceramic matrix.

10. The method according to claim 9, wherein the step of applying heat to the dried coating is accomplished using a heat source selected from the group consisting of heat guns, heat blankets, heat lamps, and torches.

11. The method according to claim 9, wherein the step of applying heat to the dried coating is accomplished by installing the component in the flowpath of a gas turbine engine and operating the engine.

12. The method of claim 9, wherein the sufficiently high temperature to modify the binder is at least about 550 degrees Fahrenheit.

13. The method according to claim 1, wherein the steps are performed while the component remains installed in the flowpath of a gas turbine engine.

14. The method according to claim 1, wherein the step of providing the ceramic coating composition includes providing a composition comprising: the ceramic powders comprise about 5 to about 65 weight percent of ceramic powder of at least 99% purity with having a particle size less than about 1 micron but greater than about 30 nanometers; about 5 to about 75 weight percent of ceramic powder of at least 99% purity having a particle size between about 45 microns to about 75 microns; about 5 to about 70 weight percent of the at least one nano-sized ceramic material; about 4 to about 45 weight percent of the binder; and about 2 to about 35 weight percent of the solvent.

15. The method according to claim 1, wherein the step of providing the ceramic coating composition includes providing a composition comprising: about 8 to about 15 weight percent of alumina of at least 99% purity and having a particle size less than 1 micron but greater than 30 nanometers, about 20 to about 40 weight percent of alumina of at least 99% purity and having a particle size of between about 45 microns to about 75 microns; about 30 to about 60 weight percent of fumed alumina; about 5 to about 20 weight percent of the binder; and about 2 to about 20 weight percent of the solvent.

16. The method according to claim 1, wherein the damaged thermal barrier coating that is locally repaired is yttria-stabilized zirconia deposited on a metallic bond coat.

* * * * *